United States Patent [19]

Piget

[11] Patent Number: 4,596,487

[45] Date of Patent: Jun. 24, 1986

[54] MECHANICAL EXPANSION DEVICE FOR INTERNALLY CLAMPING ASSEMBLED HOLLOW SECTIONS

[76] Inventor: Maurice Piget, 18, rue du Bout de Bas, Jouy sur Eure 27120 Pacy sur Eure, France

[21] Appl. No.: 661,524

[22] Filed: Oct. 16, 1984

[30] Foreign Application Priority Data

Oct. 17, 1983 [FR] France .............................. 83 16464

[51] Int. Cl.⁴ .............................................. F16B 7/00
[52] U.S. Cl. .................................... 403/297; 403/295; 403/205
[58] Field of Search ................ 403/297, 295, 172, 205

[56] References Cited

U.S. PATENT DOCUMENTS

| | | | |
|---|---|---|---|
| 3,051,517 | 8/1962 | Yalen | 403/297 |
| 3,304,108 | 2/1967 | Hamilton et al. | 403/295 |
| 3,606,408 | 9/1971 | Wagner | 403/297 |
| 3,858,990 | 1/1975 | Busselmeier | 403/297 X |
| 3,945,743 | 3/1976 | Koch | 403/297 X |

FOREIGN PATENT DOCUMENTS 1101663  4/1955  France .............................. 403/297

Primary Examiner—Andrew V. Kundrat
Attorney, Agent, or Firm—Sughrue, Mion, Zinn, Macpeak and Seas

[57] ABSTRACT

A mechanical expansion device for internally clamping assembled hollow sections includes at least two angle pieces (10) and (10') which fit inside a section (1), and at least two spherical cups (8) and (9) spaced on a rod (7) and placed between the two angle pieces. One cup (8) bears on the inner face of the angle pieces and the other cup (9), of a slightly larger diameter, bears on the inner face of the section (1) at the end of the angle pieces. Clamping is effected by flattening the cups to increase their diameters.

11 Claims, 13 Drawing Figures

U.S. Patent  Jun. 24, 1986  Sheet 1 of 4  4,596,487
FIG_1
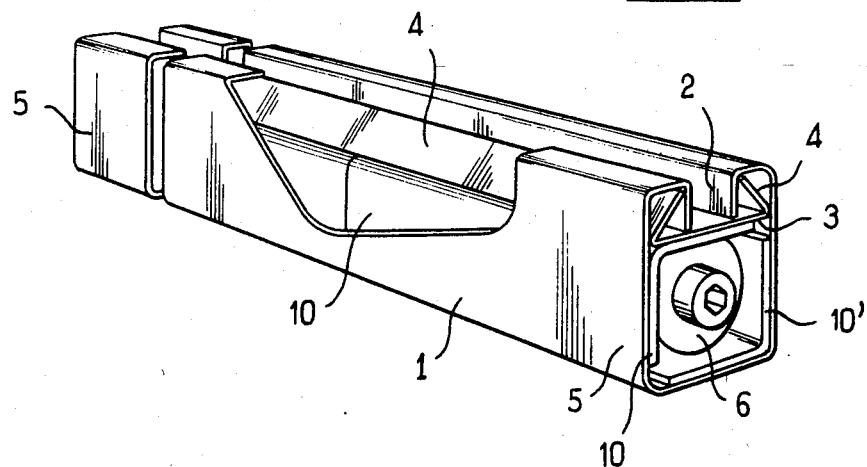
FIG_2
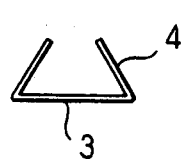
FIG_3
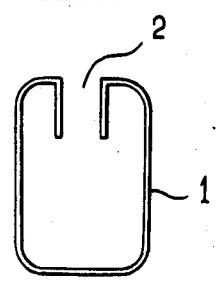
FIG_4
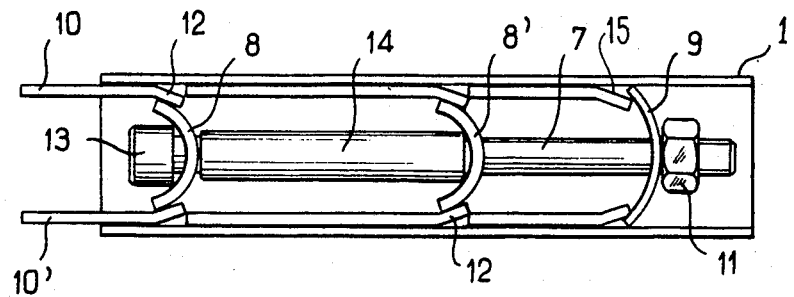

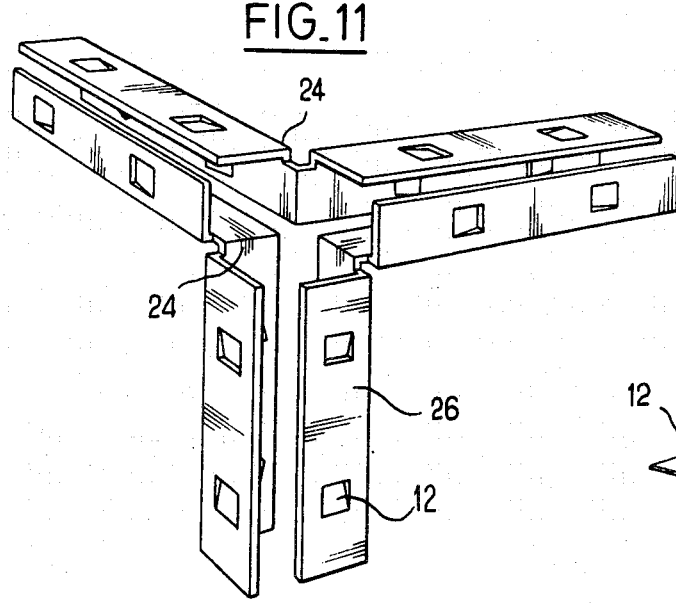
FIG. 11
FIG. 8
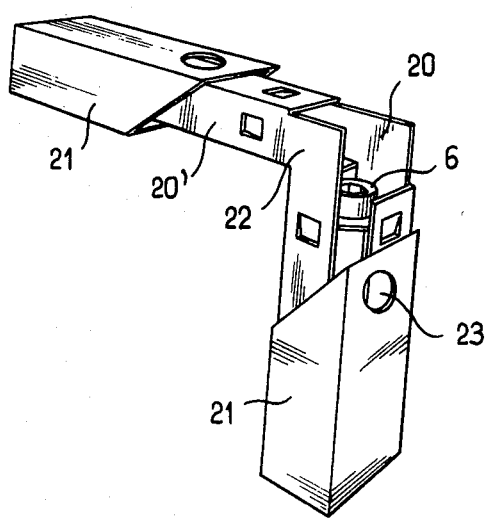
FIG. 9
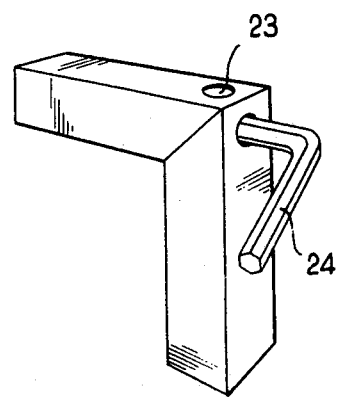
FIG. 10

MECHANICAL EXPANSION DEVICE FOR INTERNALLY CLAMPING ASSEMBLED HOLLOW SECTIONS

BACKGROUND OF THE INVENTION

The present invention relates to a device for producing structures in the form of sections and, more particularly, to a mechanical device making it possible to reinforce and assemble sections of various shapes.

For the construction of many structures, such as frameworks, furniture, elements of interior architecture, chassis, etc., various types of sections are used, usually obtained by bending on roller machines. They are generally of symmetrical shape and have an open face. Such open sections are usually easier and less expensive to produce than closed sections of a shape similar to a continuous fiber, but the mechanical characteristics are not as good. However, their use of such open sections is unavoidable in some constructions for reasons of shaping or use, and the constructions obtained lack rigidity and strength and can only be considered for small dimensions or for uses involving only low working forces.

SUMMARY OF THE INVENTION

The object of the present invention is a mechanical device which makes it possible to overcome the disadvantages mentioned above.

The object of the invention is also a simple mechanical device which makes it possible to assemble and reinforce open or closed sections, to produce structures having excellent mechanical resistance.

Another object of the invention is a device for assembling and reinforcing sections, to produce dismountable structures, while at the same time preserving the geometry of open sections, but reinforcing its mechanical resistance.

Yet another object of the invention is a process for reinforcing and assembling sections to produce various structures.

The mechanical expansion device for assembling and reinforcing sections according to the invention comprises:

at least two angle pieces capable of coming up against the inside of the section;

at least two cups, each in the form of a portion of a sphere, which are strung on a rod placed between two angle pieces and at least one of which can bear on the inner face of the angle pieces and the other, of slightly larger diameter, bears on the inner face of the section at the end of the angle pieces;

means of clamping the cups on the rod and pressing them against the inner faces of the angle pieces and of the section.

According to a characteristic of the invention, the inner face of the angle pieces has roughnesses or slots making it easier to position the cups. These roughnesses can consist of raised portions, against which the cups bear, with the exception of the end cup, of a diameter slightly greater than that of the others, which bears against the inner face of the section.

According to one embodiment, each inner face of an angle piece has at least two raised portions arranged in two parallel planes. It is also possible to arrange the raised portions with opposite inclinations two by two. According to an alternate form, the raised portions are replaced by slots in which are inserted the cups which bear on their edges.

It is possible to arrange the cups in parallel and, for example, it it possible to provide two cups placed between the angle pieces and separated by a spacer, while a third cup of slightly larger diameter is locked between the end of the angle pieces and the nut placed on the threaded rod.

It is also possible to connect the cups two by two, edge to edge, more particularly when the angle pieces have slots in which the edges of the cups engage. In this case, it can prove sufficient to place two cups, connected face to face, between the angle pieces and two cups, likewise connected face to face, locked between the end of the angle pieces and the nut at the end of the threaded rod. A spacer separates the two groups of cups. In this case, the cups can be simple Belleville washers.

When the clamping means is actuated, the end cups are flattened, their diameter increases and their edges are compressed against the inner face of the section as result of a punching effect. The other cups, locked between the head of the threaded rod and a spacer or between two successive spacers in the case of several cups, are flattened and bear by means of their edges against the angle pieces which they lay against the walls of the section with a high pressure.

For the angular assembly of sections, the angle pieces have the form of right-angle pieces, making it possible to assemble two or more sections orthogonally. Two sections are assembled at right angles by means of two identical right-angle pieces each comprising a simple right-angle piece which is placed in the plane of the maximum force exerted on the assembly of sections and which carries a tongue perpendicular to each wing on two non-contiguous edges. Three sections are assembled orthogonally by means of three identical right-angle pieces formed by joining two simple angle pieces together at right angles by one of their ends. The use of a larger number of angle pieces makes it possible to join together several sections.

For the angular assembly of sections, the mechanism according to the invention can be clamped by means of action on the nut or on the head of the threaded rod via a spanner which is introduced through a slot made in one face of each section at its end.

According to an advantageous embodiment of the invention, the assembly and reinforcement device of the invention can be used for open sections. In this case, it is preferable to reinforce the section, the aperture of which has two set-in folds, by means of a reinforcing strip, the edges of which are bent in such a way that the strip, placed in the section, blocks the aperture and the bent edges come up against the inner wall of the set-in folds of the aperture. The angle pieces are placed in the section so as to come up against the three continuous faces of the section and against the reinforcing strip.

In the process for assembling and reinforcing open or closed sections according to the present invention, a rod carrying at least two cups is engaged in the section, and two angle pieces are then introduced between the rod and the walls of the section and are laid against the inner walls of the section, if appropriate against a reinforcing strip blocking the aperture of the open section, in such a way that the end of the angle pieces comes up against the cup or cups placed at the end of the rod, the unit as a whole is inserted in the section up to the desired position, and the clamping means are actuated so as to cause the end cup or cups to be crushed against the inner walls of the section and the other cups to be crushed against the angle pieces laid against the section.

Of course, the movement of installing the angle pieces and the rod carrying the cups in the section is relative, and it is possible either to slide the unit consisting of the angle pieces, rod and cups into a fixed section or to slide the section over the unit. Thus, when three orthogonal sections are assembled by means of three suitable angle pieces, the first two angle pieces and the rod carrying the cups are installed in the first section, the clamping means is actuated, the other two sections are then slipped over the wings of the first two angle pieces, completed by the third angle piece surrounding the two rods, up to the desired position, and the two clamping means are actuated by means of a spanner through the slots made at the end of the sections.

The device according to the invention is used, in particular, for producing glazed structures and large-sized doors as a result of the direct incorporation of the glass panes in open sections, and avoids the use of covers or outer gaskets because external surfaces without any projection or roughness are obtained. It is particularly suitable for the construction of protective frames for industrial machines. Moreover, it has the advantage of being dismountable.

BRIEF DESCRIPTION OF THE DRAWINGS

The characteristics and advantages of the invention will emerge in more detail from the following description relating to preferred and non-limiting embodiments, with reference to the attached drawings in which:

FIG. 1 shows a perspective view, partially cut away, of two open sections connected end to end by means of the device according to the invention.

FIG. 2 shows a cross-section of the open section used in FIG. 1.

FIG. 3 shows a cross-section of the reinforcing piece used in FIG. 1.

FIG. 4 shows a longitudinal section of the device of FIG. 1.

FIG. 8 shows a perspective view of a right-angle piece which can be used in the invention.

FIG. 9 shows a perspective view of an assembly of two sections by means of two right-angle pieces according to FIG. 8.

FIG. 10 shows the assembly of FIG. 9 in its final form.

FIG. 11 shows a perspective view illustrating the use of three right-angle pieces according to FIG. 8 for assembling three orthogonal sections.

DETAILED DESCRIPTION OF THE PREFERRED EMBODIMENTS

Figure 5:
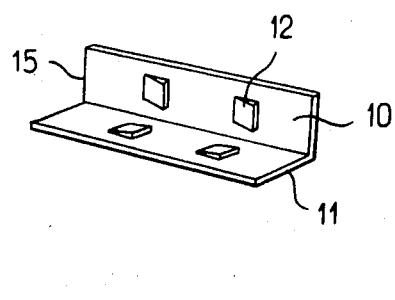
FIG. 5 shows a perspective view of an angle piece used in FIG. 1.

The device illustrated in FIG. 1 is suitable for a section (1) made of aluminum alloy, which has an aperture (2) and which is reinforced at the level of the aperture (2) by a strip (3) made of the same alloy as the section (1), the edges (4) of which are bent to come up against the folds of the aperture (2) on the inside of the section (1), so as to prevent the aperture from widening. Furthermore, the bending of the edges (4) increases the rigidity and the modulus of inertia of the strip (3) which is fastened in the section (1) at each of its ends (5).

The cross-sectional form of the section (1) and of the strip (3) is shown clearly in FIGS. 2 and 3.

An expansion mechanism (6), the structure and mode of operation of which are described below, is introduced into the section (1) at each of its ends (5). As shown in FIG. 1, the mechanism (6) bears against the three continuous surfaces of the section (1) and against the strip (3).

The mechanism (6) possesses a threaded rod (7) which carries two cups (8) and (8') and one cup (9) of slightly larger diameter, acting on two angle pieces (10) and (10') as a result of clamping by means of the nut (11). Each of the two angle pieces (10) and (10') has the shape illustrated in FIG. 5 and possesses small raised portions (12) formed in the metal angle piece by means of stamping at regular intervals. As regards the angle pieces (10) and (10'), these raised portions (12) are oriented in the same direction.

As shown in FIG. 4, the two cups (8) and (8') bear against the raised portions (12), while the cup (9) bears against the inner wall of the section (1) at the end of the angle pieces (10) and (10'). The first cup (8) is retained by the head (13) of the threaded rod (7), while it is separated from the second cup (8') by the spacer (14) which ensures that the cups are parallel to one another when the nut (11) is tightened. When the nut (11) is tightened on the threaded rod (7), the cup (9) bears on the end (15) of the angle pieces (10) and (10') and tends to flatten under the effect of the tightening action, in such a way that its diameter increases slightly and its edges dig into the inner wall of the section (1) and into the lower face of the strip (3). At the same time, the cups (8) and (8') are compressed between the raised portions (12), formed in the angle pieces (10) and (10'), and the head (13) of the threaded rod (7) or the spacer (14), depending on the cup in question. Of course, clamping can be effected as a result of action on the head (13).

Figure 6:
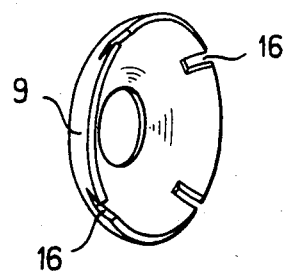
FIG. 6 shows a perspective view of a cup used in FIG. 1.

To obtain better elasticity and more substantial deformation, the cup (9) is provided with recesses (16) shown in FIG. 6, which are arranged at regular intervals on its edge.

Figure 7:
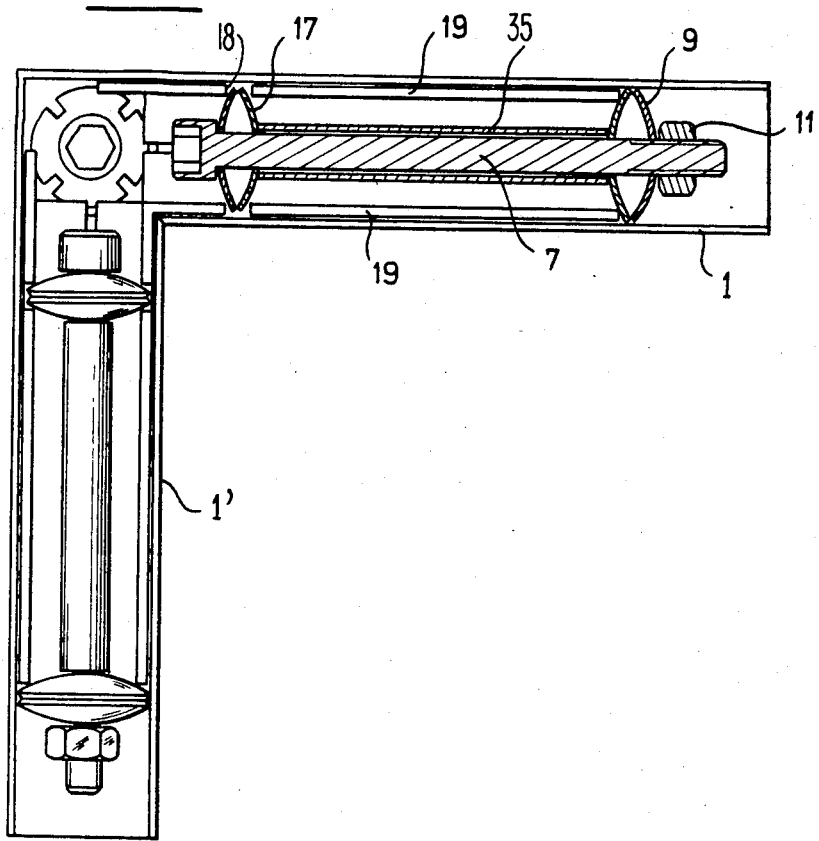
FIG. 7 shows a cross-section of an assembly of three sections by means of an alternative form of the invention.

FIG. 7 illustrates an alternate form of the device according to the invention, used for the orthogonal assembly of three sections, of which two, (1) and (1'), are seen in cross-section and the third in an end view. These sections are of the same type as that of FIG. 1.

This device uses two cups (9) associated face to face, edge to edge, and two cups (17) of smaller diameter, which are arranged in the same way and which are likewise mounted on the rod (7). The two cups (17) are locked by means of their edges in slots (18) made in the angle pieces (19), while the cups (9) are locked between the nut (11) and the end of the angle pieces (19). The spacer (35) maintains the two pairs of cups at a constant distance from one another. The clamping effect, brought about by action on the nut (11) or on the head of the threaded rod (7), causes the cups to be compressed; the two cups (17) become more flattened and thus the diameter at their interface increases to push the angle pieces (19) against the inner wall of the section (1) and against the lower face of the strip (3) (not shown in FIG. 7) as a result of their bearing against the edges of the slots (18), the width of which is calculated to allow the positioning of the cups (17) to ensure that they are in permanent contact with the angle pieces (19); under the compression effect, the two cups (9) punch into the inner walls of the section (1) and the lower face of the strip (3). The cups (9) and (17) can be replaced by Belleville washers.

The angle pieces (19) used in the device of FIG. 7 have a right-angle shape, like those illustrated in FIG. 11, to allow three sections to be assembled orthogonally.

FIG. 8 shows a right-angle piece (20) in which the metal raised portions (12) are not parallel, as they are in the angle piece (10), but opposed two by two, thus making it possible to simplify the construction; in fact, in this case, the cup (9) (see FIG. 4) is omitted and only two cups, such as in FIG. 4, are used, but the cup (8') is inverted so as to bear against the corresponding raised portion (12), and the angle pieces (20) thus serve, solely as result of expansion, to ensure the strength of assembly by means of simple adhesion or friction.

FIGS. 9 and 10 show the method of assembling the right-angle pieces (20) and (20'), the clamping mechanism (6) and the sections (21). Because of their shape, the right-angle pieces (20) acquire a continuous face (22) parallel to the plane of the longitudinal axes of the two sections (21) assembled at right angles, thus improving the mechanical resistance in view of the forces to which the sections are subjected. Each of the sections (21) has an aperture (23) making it possible to act on the clamping mechanism (6), when the sections are in place, by means of the hexagonal spanner (24). Because of the alternate position of the wings (25) as seen in FIG. 8, the two right-angle pieces (20) are identical and interchangeable. Once assembled, the two sections (21) have no outer projection or protuberance, and the apertures (23) can be closed off by means of a leakproof plug.

The use of the right-angle piece (26) having the same raised portions (12) makes it possible to assemble three orthogonal sections, as shown in FIG. 11.

Figure 12:
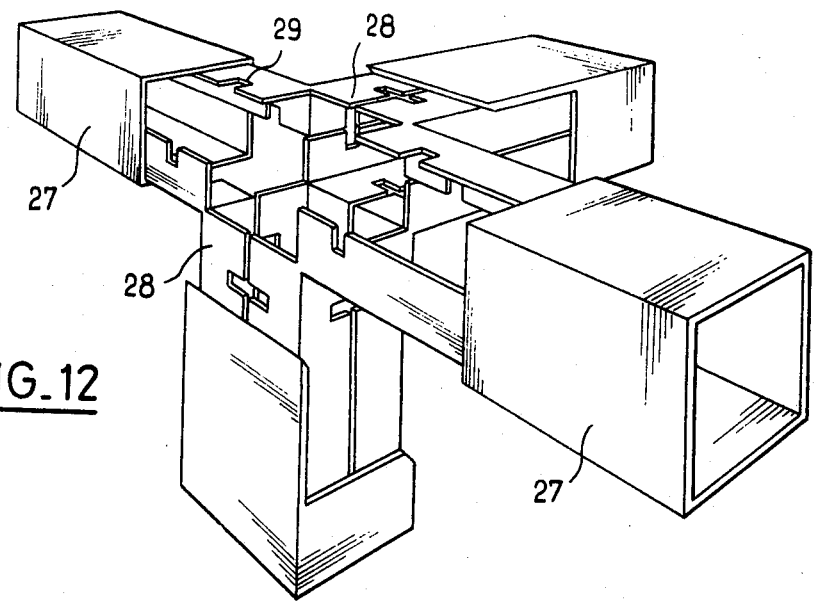
FIG. 12 shows a perspective view of an assembly of four orthogonal sections by means of an alternative form of the invention.

The assembly consisting of four sections (27), shown in FIG. 12, uses right-angle pieces (28) which are identical to the angle pieces (26), but in which the raised portions have been replaced by notches (29). The angle pieces (28) are assembled in such a way that the notches (29) are opposite one another, forming slots, as at 18 in FIG. 7, which accomodate the cups of the clamping device. As before, the angle pieces and clamping devices are installed in the sections, the sections are then slid up to their final position, and the clamping devices are actuated by means of a spanner through apertures (not shown) which can subsequently be closed off if appropriate.

Figure 13:
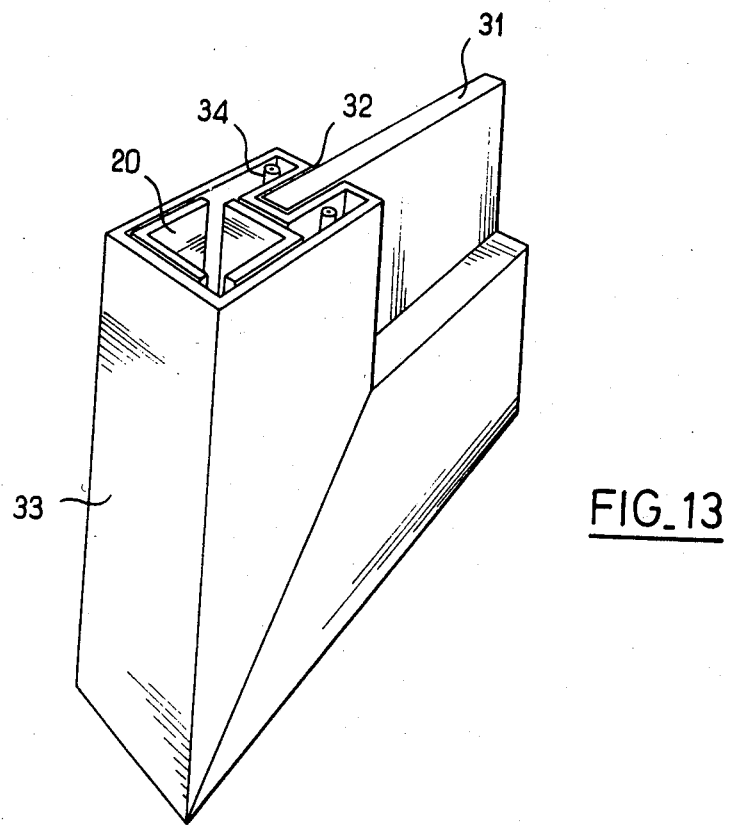
FIG. 13 shows a perspective view of a use of the device of the invention for a closed section.

FIG. 13 illustrates the use of right-angle pieces identical to the angle pieces (20) of FIG. 8 and of the clamping mechanism to assemble two closed sections forming the structure of a machine protection. The glass pane (31) is retained in a cavity (32) of the section (33) which contains the conductor wires (34) of the safety circuit.

Various modifications can be made to the invention without departing from its scope. In particular, as regards a section of rectangular cross-section or of diverse shape, it is sufficient to place in the section a piece of suitable shape, having the same length as the expansion mechanism, in order to reproduce a square cross-section suitable for the mechanism of the invention.

I claim:

1. A mechanical expansion device for assembling and reinforcing elongate hollow tubular members open at at least one end, comprising:

(a) a pair of elongate, complementarily configured angle pieces (10, 10') insertable within an open end of a tubular member such that outer surfaces of the angle pieces bear against inner surfaces of said member and inner surfaces of the angle pieces together define an elongate hollow cavity, (b) an elongate rod (7) insertable within the cavity, (c) at least two flexible, spherical, centrally apertured discs (8, 9) disposed on the rod spaced apart from each other, a first one of said discs (8) engaging the inner surfaces of the angle pieces and a second, larger diameter one of said discs (9) engaging the inner surfaces of the tubular member and abutting a proximate end of the angle pieces, and (d) means (11) for urging the discs toward each other such that their diameters change to firmly clamp the angle pieces against the tubular member.

2. A device as claimed in claim 1, wherein the inner surfaces of the angle pieces have irregularities for positionally engaging the discs.

3. A device as claimed in claim 1, wherein the urging means comprises a thread on the rod for receiving a nut (11) and a spacer sleeve (14) separating the discs.

4. A device as claimed in claim 2, wherein the irregularities comprise raised portions (12) against which the discs bear.

5. A device as claimed in claim 4, wherein each inner face of an angle piece has at least two raised portions (12) arranged in two parallel planes.

6. A device as claimed in claim 4, wherein each inner face of an angle piece has two raised portions (12) with opposite inclinations.

7. A device as claimed in claim 2, wherein the irregularities comprise transverse slots (18) for accommodating outer peripheral edges of the discs.

8. A device as claimed in claim 1, wherein there are four discs arranged in two pairs, edge to edge.

9. A device as claimed in claim 1, wherein the angle pieces are right-angle pieces for the angular assembly of two tubular members.

10. A device as claimed in claim 1, wherein the tubular member has an open side defined by two bent in flanking sides and closed off by a reinforcing strip (3) having inwardly bent edges (4) which engage inner faces of the bent in flanking sides.

11. A device as claimed in claim 1, wherein each tubular member of an angular assembly of two such members has an aperture (23) proximate its end to access the urging means.

* * * * *